(12) United States Patent
Söhne et al.

(10) Patent No.: US 6,397,333 B1
(45) Date of Patent: May 28, 2002

(54) COPY PROTECTION SYSTEM AND METHOD

(75) Inventors: Peter Söhne, Röhrmoos; Jörg Schepers, Rottach-Egern; Dietmar Zaig, Holzkirchen; Michael Smola, München, all of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/167,273

(22) Filed: Oct. 7, 1998

(51) Int. Cl.$^7$ ................................................. H04L 9/00
(52) U.S. Cl. ........................ 713/176; 713/189; 705/56; 705/57
(58) Field of Search ............................... 705/51, 56–57, 705/59, 60, 67; 713/193, 176, 189; 380/277

(56) References Cited

U.S. PATENT DOCUMENTS 4,934,846 A * 6/1990 Gilham ........................ 400/104
5,392,351 A * 2/1995 Hasebe et al. ................ 705/51
5,796,824 A   8/1998 Hasebe et al.
6,230,149 B1 * 5/2001 Shah et al. .................... 705/62

FOREIGN PATENT DOCUMENTS

| DE | 196 30 755 A1 | 9/1997 | |
| EP | 0 715 242 A1 | 6/1906 | |
| EP | 0715242 | * 5/1996 | ............. G06F/1/00 |

* cited by examiner

*Primary Examiner*—Gilberto Barron, Jr.
*Assistant Examiner*—Ho S. Song
(74) *Attorney, Agent, or Firm*—Laurence A. Greenberg; Werner H. Stemer; Ralph E. Locher

(57) ABSTRACT

The copy protection system is a combination of a signature method and a coding or encryption method that uses a variable key. The data set is written only onto a predetermined device and it is released to a host for reading and deciphering only upon proper authorization. Copying of the encrypted data set is entirely useless, because the dataset is signed with a unique identification (e.g. the serial number) of the device.

7 Claims, 1 Drawing Sheet

COPY PROTECTION SYSTEM AND METHOD

BACKGROUND OF THE INVENTION

FIELD OF THE INVENTION

The invention relates to software piracy prevention. More specifically, the invention pertains to a novel method of protecting digital data against unauthorized copying and use.

Digital media have become popular carriers for various types of data information. Computer software and audio information, for instance, are widely available on optical compact disks (CDs). Recently, the digital audio tape (DAT) has gained in distribution share. The CD and the DAT utilize a common standard for the digital recording of data, software, images, and audio. Additional media, such as multimedia compact disks (MCD), digital video disks (DVD), super density disks, and the like, are making considerable gains in the software and data distribution market.

The substantially superior quality of the digital format as compared to the analog format renders the former substantially more prone to unauthorized copying and pirating. Copying of a digital data stream—whether compressed, uncompressed, encrypted or non-encrypted— typically does not lead to any appreciable loss of quality in the data. Digital copying thus is essentially unlimited in terms of multi-generation copying. Analog data with its substantial signal to noise ratio, on the other hand, is naturally limited in terms of multi-generation and mass copying.

The advent of the recent popularity in the digital format has also brought about a slew of copy protection systems and methods. These are generally grouped in categories such as encryption, copy protection, and content extensions.

Prior art methods of preventing unauthorized copying of copyrighted and protection-worthy data do not attain a particularly high degree of protection.

Encryption, which is used in the digital and the analog format, essentially scrambles the information. The data stream can be made usable only with the proper key. It has been found that encryption is usually easy to crack. Once the key has been found by a copy pirate, the information may be freely multiplied without encryption.

Software copy protection was widely used during the early days of the personal computer. However, software manufacturers essentially stopped copy protection once it was found that, on the one hand, virtually all copy protection codes would be quickly broken by hackers and, on the other hand, the development of new types of copy protection was becoming prohibitively expensive. Furthermore, non-protected programs soon turned out to become so widely used—even though many copies were unauthorized—that the additional sales could largely make up for the bootleg losses.

Several popular programs use a system in which an installation key is delivered with the original program packaging of the data carrier (e.g. CD or floppy). The installation key is required before the program data can be installed on a PC. It is thereby easily possible to copy the key together with the data content of the CD any number of times and to thus distribute and bring into circulation any number of pirated copies.

Another established protection mechanism comprises preventing copying in general with the aid of special protocol conventions. Such protocols have been established, for instance, in the audio application of DAT recorders. As noted above, CD and DAT data formats are substantially identical and, accordingly, multi-generation copying would be possible. In the DAT system, therefore, the CD to be copied is queried for special copy protection information and, if the protection is activated, the DAT recorder is not authorized for copying. Such a method, however, is disadvantageous in that a high degree of discipline with regard to the target devices is necessary. Special anti-copy circuitry must be included in the recorder. Such a system is known as the serial copy management system (SCMS). The end user is not generally interested in those measures. It has been shown that the discipline is not always maintained. In particular, black boxes for filtering the copy-prohibit instruction from the digital signal are widely available. Recently, also, the use of modern PCs makes it possible to easily manipulate such mechanisms and, in the end, to circumvent them.

A prior art copy protection system is described, for instance, in German patent application DE 196 30 755 A1. There, a semiconductor mass storage medium is divided into two memory regions. One of the regions is provided with a non-changeable signature. The signature states whether data can be stored in the primary memory region only with authorization or by anybody. This allows (pirated) copies to be distinguished from the original.

SUMMARY OF THE INVENTION

It is accordingly an object of the invention to provide a copy protection method and system, which overcomes the above-mentioned disadvantages of the heretofore-known devices and methods of this general type and which safely protects against copying of protected data from one medium onto an equivalent storage medium and the identical use of the copied data as the data on the original storage medium. It is a particular object to prevent the reading-out of information while retaining existing protection mechanisms and the subsequent copying of the deciphered data. Finally, it is a specific object of the novel method to prevent copying from one device onto a device of the same type (e.g. multimedia card), i.e. to render the data on the target device unusable.

With the foregoing and other objects in view there is provided, in accordance with the invention, a method of preventing unauthorized copying of data, which comprises:

communicating a unique identification of a device to a content provider;

adding the unique identification as an authenticating signature to a data set to form a signed data set;

copying the signed data set with the unique identification from the content provider to the device;

encoding the data set in the device with the unique identification to form cipher data;

communicating the unique identification of the device to a host; and reading the cipher data with the host and decoding the cipher data to restore and use the data set in the host.

In accordance with an added feature of the invention, a random number is generated in the host or in the device, and wherein the encoding step comprises encoding the data set with a dynamic key formed with the unique identification and the random number.

In accordance with an additional feature of the invention, the authenticating signature is formed from the unique identification and a private key of the provider, and, following the copying step, the signed data set is checked with the private key against a public key present in the device.

In accordance with another feature of the invention, the signed data set is checked in the device and, if the authenticating signature in the signed data set does not match the unique identification of the device, any output of the data set from the device to the host is blocked.

With the above and other objects in view there is also provided, in accordance with the invention, a copy protection system, comprising:

a device having a unique identification and having an input for receiving signed data formed from a data set and the unique identification;

a controller in the device for authenticating the signed data as authorized data, for storing the data set in the device, and for encoding the data set with a given key to form cipher data;

a host connected to the device, the host receiving the cipher data from the device, deciphering the cipher data, and processing the data set.

In accordance with a concomitant feature of the invention, there is provided a random number generator and a random number generated by the generator is included in the given key to form a dynamic key.

In other words, the invention describes a method in which the device that is to receive data monitors the authorization of the data set to be written by way of a signature, before the data on the device are released for read-out. The signature-check is combined with data enciphering, so that only authenticated data are delivered, in cipher form, from the device to the consuming unit (host).

A part of the signature is a device-specific, non-copyable feature (e.g., the serial number of the device) that identifies each device unambiguously. A further part of the signature is a secret "private key" that is only known to the owner of the data set, i.e., the content provider. The "private key" is combined with the "public key" by way of a one-way function. The public key is present in the device and it cannot be changed.

The device authenticates the data set by way of the signature against its serial number and the public key. The public/private key pair corresponds to a master key that applies to all devices. The device allows writing of only those data that are provided with the valid signature. The signature is established by the owner and the distributor of the data set as follows:

The serial number of the device is communicated to the owner of the data set.

The owner of the data set establishes the signature with the one way function, which contains the following parameters in the argument:
  the private key;
  the serial number of the target device; and
  the data set to be signed.

The user's device receives the data set and checks the signature. The device then releases the data set for read out only upon the successful checking of the signature. The host is allowed to process only data from the signed part of the device that are encrypted with an agreed-upon algorithm. Non-encrypted data or data that are otherwise encrypted are not usable by the host. Non-authenticated data are not output by the device.

The data set that is stored "straight" in the device is encrypted in dependence on:
  the serial number of the device; and
  a random number dynamically generated by the host.

Copying of an encoded data set from a device with the protection method to a device in which the (same) protection method is not implemented is possible. However, the data set is not useable because the encryption is device-dependent.

In summary, the invention is essentially a combination of a signature method with an encryption method, which uses variable keys. This achieves the effect that a data set is written only onto a predetermined device and can only be read (deciphered) from that device by the host. Copying of the encrypted data set is thus useless, because the data set is encrypted with the serial number of the device. The result is an effective copy protection system which is far superior to the methods described in the introduction.

Other features which are considered as characteristic for the invention are set forth in the appended claims.

Although the invention is illustrated and described herein as embodied in a copy protection system and method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
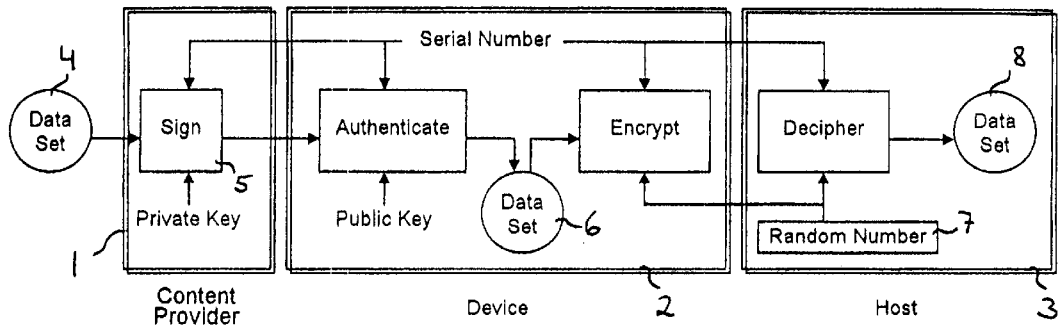
FIG. 1 is a schematic showing data flow between a content provider, a device, and a host.

Referring now to the figures of the drawing in detail and first, particularly, to FIG. 1 thereof, there is seen a system diagram where a content provider 1 prepares data to be communicated to a device 2 from which a host 3 will read and process the data content. The term "content provider" refers to the legal owner of the copyright of the data set, such as the software developer and the software distributor. The term "device" refers to any storage medium with a controller, such as a multimedia card and the like. The term "host" refers to the machine set that is enabled to read from the device and process/execute the data received from the device, such as a computer, a playstation, or the like. The data are assembled in a processor 5 from a data set 4 (e.g. software program, audio and/or video sequence, a still picture, or the like), a private key, and a unique identification of the device (e.g. serial number). The processor 5 attaches the private key and the device identification to form the signed data with a set algorithm. The specific algorithm is not essential for this description, as long it is assured that the signature and the public key can be found by the device and properly separated from the data set (decoded). Those of skill in the art will readily know how to implement the data assembly in the processor 5 and the decoding in the device (e.g. RSA, DES, etc).

The thus assembled data, i.e. the signed data, are then transmitted to the device 2. A controller in the device 2 authenticates the signed data by comparison with the device identification (serial number) and the addition of the public key. The controller then writes the data set into a memory 6. From there, the data set is read out and subjected to encrypting before the (encrypted) signal can be read by the host 3.

In addition to encrypting with the serial number of the device, a random number is incorporated into the cipher data encryption. The random number is output from a random number generator 7 in the host 3 or in the device. The random number is also used in the deciphering of the cipher data. After deciphering in the host, the data set 8 is ready for processing or execution.

Figure 2:
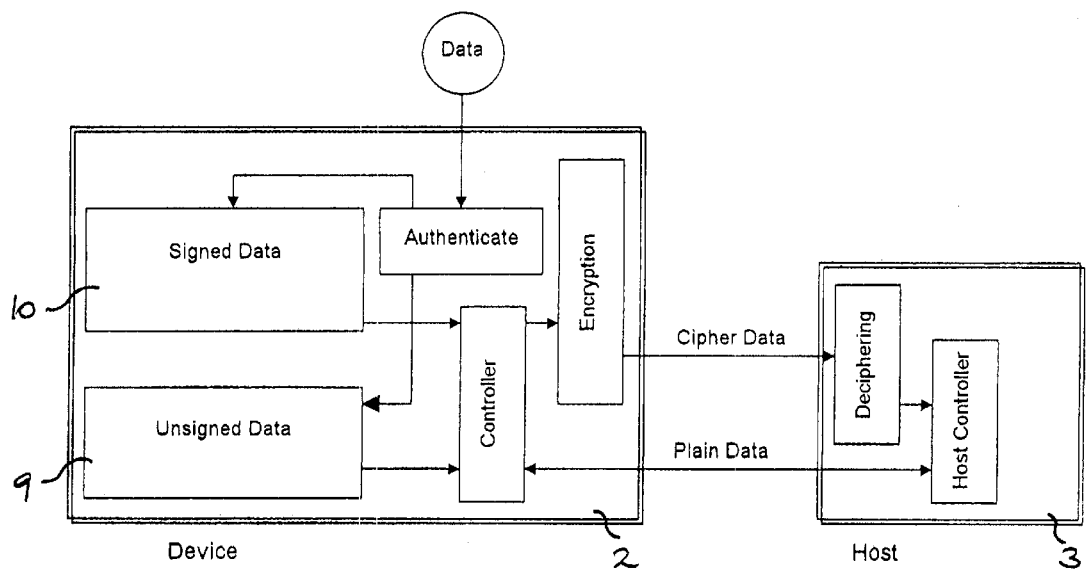
FIG. 2 is a schematic diagram of an embodiment of the invention for the common utilization of encrypted data and plain data.

Referring now to FIG. 2, there is shown a specific embodiment of a combination device, which stores both signed and unsigned data. The data input into the device 2 are first checked for a signature and, if they are signed, for authenticity. Unsigned data ("plain data") are stored without any changes in a corresponding memory location 9. Signed data are also stored in a corresponding memory location 10. A signed data set that is recognized as valid is allowed to be deciphered and used in the host. In the case of a non-signed data set, the data are output by the device in non-encrypted form as plain data. This allows signed data to be stored on and read from a storage medium together with private data. When an encrypted data set is copied as an unsigned data set onto the same device (non-signed), then it can no longer be deciphered, because the host uses a dynamic key.

The double arrows between the memory region 9 and the host controller (with the device controller in between) exemplify the usefulness of the dynamic key used in the cipher data exchange between the device and the host. Without the dynamic key it would be possible to read signed data into the host once and then write the data back into the device, or an equivalent device, as plain data. Unbridled copying and multiplication would once more be enabled. The dynamic key thus prevents such unauthorized multiplication.

We claim:

1. A method of preventing unauthorized copying of data, which comprises:

communicating a unique identification of a device to a content provider;

adding the unique identification as an authenticating signature to a data set to form a signed data set;

copying the signed data set with the unique identification from the content provider to the device;

encoding the data set in the device with the unique identification to form cipher data;

communicating the unique identification of the device to a host; and reading the cipher data with the host and decoding the cipher data to restore and use the data set in the host.

2. The method according to claim 1, which further comprises generating a random number, and wherein the encoding step comprises encoding the data set with a dynamic key formed with the unique identification and the random number.

3. The method according to claim 1, which comprises forming the authenticating signature from the unique identification and a private key of the provider, and, following the copying step, checking the signed data set with the private key against a public key present in the device.

4. The method according to claim 1, which comprises checking the signed data set in the device and, if the authenticating signature in the signed data set does not match the unique identification of the device, blocking any output of the data set to the host.

5. A copy protection system, comprising:

a device having a unique identification and having an input for receiving signed data formed from a data set and the unique identification;

a controller in said device for authenticating the signed data as authorized data, for storing the data set in said device, and for encoding the data set with a given key to form cipher data;

a host connected to said device, said host receiving the cipher data from said device, deciphering the cipher data, and processing the data set.

6. The system according to claim 5, wherein said host includes a random number generator and a random number generated in said host is included in said given key.

7. The system according to claim 5, which further comprises a random number generator for generating a random number to be included in said given key.

* * * * *